United States Patent
Lee et al.

(10) Patent No.: US 8,736,136 B2
(45) Date of Patent: May 27, 2014

(54) MAGNETIC FIELD MANIPULATION IN SWITCHED RELUCTANCE MOTORS AND DESIGN METHOD

(75) Inventors: Jaewook Lee, Ann Arbor, MI (US); Ercan Mehmet Dede, Ann Arbor, MI (US); Debasish Banerjee, Ann Arbor, MI (US); Hideo Iizuka, Nissin (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 565 days.

(21) Appl. No.: 13/028,712

(22) Filed: Feb. 16, 2011

(65) Prior Publication Data
US 2012/0206001 A1 Aug. 16, 2012

(51) Int. Cl.
*H02K 1/00* (2006.01)
*H02K 1/08* (2006.01)
*H02K 1/24* (2006.01)
*H02K 19/06* (2006.01)
*H02K 37/02* (2006.01)

(52) U.S. Cl.
USPC ............ 310/216.075; 310/48; 310/49.43; 310/191; 310/166; 335/281

(58) Field of Classification Search
USPC ........... 310/216.074, 216.075, 46, 48, 49.43, 310/191, 166, 172; 361/143; 343/909; 322/52; 335/284, 306, 236, 244; 342/1, 342/4–5; 336/84 M
See application file for complete search history.

(56) References Cited

U.S. PATENT DOCUMENTS

| | | | | |
|---|---|---|---|---|
| 3,781,736 A | * | 12/1973 | Parker | 335/304 |
| 4,549,155 A | * | 10/1985 | Halbach | 335/212 |
| 4,698,537 A | | 10/1987 | Byrne et al. | |
| 4,748,362 A | * | 5/1988 | Hedlund | 310/168 |
| 4,918,831 A | | 4/1990 | Kliman | |
| 4,967,464 A | | 11/1990 | Stephens | |
| 5,220,228 A | | 6/1993 | Sibata | |
| 5,428,257 A | | 6/1995 | Lurkens | |
| 5,668,430 A | | 9/1997 | Kolomeitsev | |
| 5,747,912 A | | 5/1998 | Sakuma et al. | |
| 5,789,883 A | * | 8/1998 | Gilman | 318/254.2 |
| 5,790,006 A | * | 8/1998 | Abele et al. | 335/306 |
| 5,844,346 A | | 12/1998 | Kolomeitsev et al. | |

(Continued)

FOREIGN PATENT DOCUMENTS

| | | | | |
|---|---|---|---|---|
| JP | 09-285044 | * | 10/1997 | H02K 1/14 |
| JP | 10-322992 | * | 12/1998 | H02K 19/10 |

OTHER PUBLICATIONS

M.P. Imani, A. Grbic, "Near-field focusing with a corrugated surface," IEEE Antennas and Wireless Propagation Letters, vol. 8, 2009.

(Continued)

*Primary Examiner* — Burton Mullins
(74) *Attorney, Agent, or Firm* — Gifford, Krass, Sprinkle, Anderson & Citkowski, P.C.

(57) ABSTRACT

A switched reluctance motor includes a stator and a rotor, the stator having stator poles supporting a magnetic field focusing device such as a near field plates on each stator pole tip. An example near field plate has a spatially modulated surface reactance configured so as to focus magnetic flux extending from each pole tip within at least one region of increased magnetic field proximate the pole tip.

10 Claims, 7 Drawing Sheets

(56) References Cited

U.S. PATENT DOCUMENTS

| | | | |
|---|---|---|---|
| 5,852,335 A | 12/1998 | Suzuki et al. | |
| 5,886,442 A * | 3/1999 | Ogino et al. | 310/181 |
| 5,917,263 A * | 6/1999 | Sakuma et al. | 310/254.1 |
| 5,945,761 A | 8/1999 | Sakuma | |
| 6,025,668 A * | 2/2000 | Kolomeitsev | 310/187 |
| 6,066,904 A | 5/2000 | Fei et al. | |
| 6,072,260 A | 6/2000 | Randall | |
| 6,093,993 A | 7/2000 | McClelland | |
| 6,232,693 B1 | 5/2001 | Gierer et al. | |
| 6,504,281 B1 * | 1/2003 | Smith et al. | 310/190 |
| 6,538,621 B1 * | 3/2003 | Sievenpiper et al. | 343/909 |
| 6,624,538 B2 | 9/2003 | Janisiewicz et al. | |
| 6,720,686 B1 | 4/2004 | Horst | |
| 6,768,051 B2 * | 7/2004 | Wiltshire et al. | 174/391 |
| 6,859,114 B2 * | 2/2005 | Eleftheriades et al. | 333/156 |
| 6,960,862 B2 | 11/2005 | Hill | |
| 7,116,030 B2 | 10/2006 | Torok | |
| 7,202,626 B2 * | 4/2007 | Jadric et al. | 318/254.1 |
| 7,420,308 B2 | 9/2008 | Ramu et al. | |
| 7,570,432 B1 * | 8/2009 | Yonak | 359/652 |
| 2004/0155545 A1 | 8/2004 | Kaplan et al. | |
| 2009/0167119 A1 | 7/2009 | Nakayama et al. | |
| 2009/0303154 A1 | 12/2009 | Grbic et al. | |
| 2010/0148598 A1 | 6/2010 | Kim et al. | |
| 2011/0031839 A1 * | 2/2011 | Fullerton et al. | 310/152 |
| 2012/0019432 A1 * | 1/2012 | Bowers et al. | 343/909 |
| 2012/0146752 A1 * | 6/2012 | Fullerton et al. | 335/306 |
| 2012/0262019 A1 * | 10/2012 | Smith et al. | 310/156.07 |
| 2013/0003245 A1 * | 1/2013 | Banerjee et al. | 361/143 |
| 2013/0135071 A1 * | 5/2013 | Roberts et al. | 335/306 |

OTHER PUBLICATIONS

A. Grbic, L. Jiang, R. Merlin, "Near-field plates: subdiffraction focusing with patterned surfaces," Science, vol. 320, 2008.

A. Grbic, R. Merlin, "Near-field focusing plates and their design," IEEE Transactions on Antennas and Propagation, vol. 56, 2008.

Lee et al., "Topology optimization of switched reluctance motors for the desired torque profile," Struct Multidisc Optim, 42: 783-796 (2010).

* cited by examiner

MAGNETIC FIELD MANIPULATION IN SWITCHED RELUCTANCE MOTORS AND DESIGN METHOD

FIELD OF THE INVENTION

The invention relates to magnetic devices, such as motors, in particular switched reluctance motors.

BACKGROUND OF THE INVENTION

Switched reluctance motors have numerous applications. Desirable properties include a high average torque and a low torque ripple. Novel approaches to increasing the average torque, and to reducing the torque ripple, will be very useful in numerous applications.

SUMMARY OF THE INVENTION

Examples of the invention relate to motors, in particular switched reluctance motors including one or more magnetic field focusing devices, such as a near field plate or shaped magnetic element, operable to manipulate the magnetic field distribution at the air gap between stator and rotor poles. The optimal magnetic field distribution may be designed using a gradient based optimization approach. A magnetic field focusing device may be designed to give any desired magnetic field distribution.

In example switched reluctance motor (SRM), a magnetic field focusing device such as a near field plate is attached to the tip of each stator pole, so as to manipulate the magnetic field distribution produced by the stator coils. The optimal field distribution may be found as the optimal geometry of a simulation approach, using a gradient based optimization.

Previous applications of near field plates have included high frequency devices, in particular devices for which diffraction limiting is a serious problem. Near field plates have not previously been used in relatively low frequency magnetic devices, such as motors. The operating frequency of the motor may be on the order of kilohertz, for example in the range 100 Hz-10 kHz. A magnetic field focusing device such as a near field plate may be attached at the tip of each of the stator poles, so as to focus the magnetic field produced by the stator coil at specific desired locations.

Simulation results showed that an average torque increase of over 33% may be obtained, compared with a similar device lacking the magnetic field focusing devices, and the percentage torque ripple may be decreased by over 39%, when suitably configured near field plates are attached at the stator pole tips.

A near field plate may be a thin grating-like devices used manipulate the electromagnetic field distribution. In some cases, it may be thought of as an impedance sheet having a modulated surface reactance. When a magnetic field passes from one side of the plate to the other side, the field distribution is modified to a desired configuration.

An example reluctance motor comprises a stator with an annular portion and stator poles extending inwardly from the annular portion and having an inwardly-directed pole tip. The stator supports a plurality of coils, which may be selectively energized so as generate magnetic flux extending from one or more of the stator poles, so as to induce rotation of the rotor. The coils may be wound around the stator poles. The rotor includes a central rotor portion supporting a plurality of outwardly extending rotor poles, and is rotatable about the stator on sequential energization of the stator coils. One or more pole tips support a magnetic field focusing device, such as near field plate having a spatially modulated surface reactance, configured to produce at least one region of concentrated magnetic flux proximate the pole tip when magnetic flux extends from the pole tip through the magnetic field focusing device.

Magnetic flux extends from a given pole tip (e.g. when the associated coil is energized) across a gap to a rotor pole. A magnetic force on the rotor pole acts to minimize the reluctance of the system by turning the rotor so as to reduce the gap between stator and rotor poles. As is well known in the art, control signals from an electronic unit can be used to selectively and sequentially energize the stator poles in appropriate fashion to generate rotation of the rotor, with an associated torque and torque ripple, for example with switching to obtain switched reluctance motor operation.

In examples of the present invention, the near field plate producing a plurality of regions of concentrated magnetic flux proximate the pole tip so as to increase the torque and/or reduce the torque ripple of the motor. Each stator pole may have a stator coil wound around the stator pole, the stator coils being sequentially energizable by an alternating signal source. The alternating signal may have a signal frequency in the range 50 Hz-100 kHz, for example in the range 100 Hz-1 kHz. The near field plate may be configured to increase the torque and/or reduce the torque ripple of the rotor on sequential energization of the coils.

A method of increasing the torque and/or reducing the torque ripple of a switched reluctance motor having a plurality of stator poles includes locating a magnetic field focusing device such as a near field plate on each stator pole. The near field plate has a spatially modulated surface reactance configured so as to focus the magnetic flux within at least one region of increased magnetic field proximate each stator pole.

DETAILED DESCRIPTION OF THE INVENTION

Examples of the present invention include a switched reluctance motor (SRM) including one or more near field plates (NFPs). An NFP may be attached to each stator pole of the SRM. The NFP is used to obtain a field distribution that may give an enhanced torque and/or a reduced torque ripple for the motor.

Figure 1:
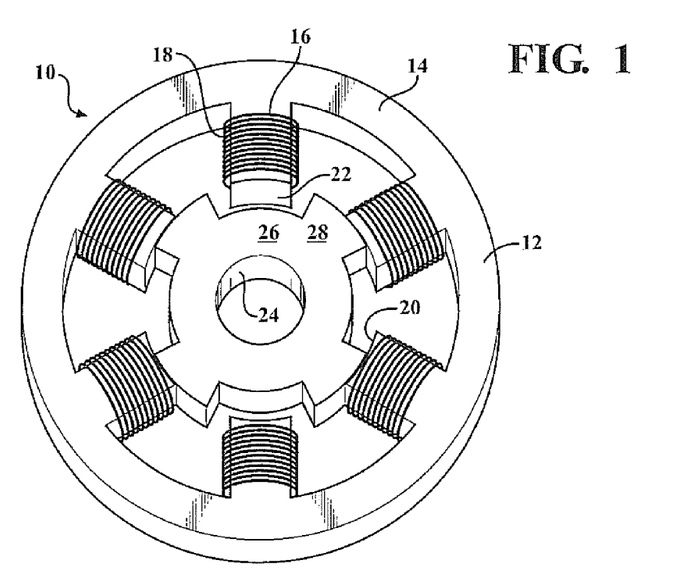
FIG. 1 shows an example switched reluctance motor having a plurality of stator coils and stator poles, at least one stator pole supporting a near field plate.

FIG. 1 shows an example apparatus, a switched reluctance motor 10 comprising a stator 12 including an annular stator portion 14 and stator poles 16 extending inwardly from the annular stator portion. Each stator pole has a pole tip 20, and a stator coil such as coil 18 is wound around each stator pole. A near field plate, such as plate 22, is supported on each pole tip. The annular portion need not have a circular outer cross-section, but may be configured in any suitable arrangement for supporting the inwardly directed poles. An annular stator portion may have an outer diameter in the range 1 cm-1 m, for example in the range 5-20 cm. However, such dimensions are exemplary and not limiting.

The motor further includes a rotor 24 having a central rotor portion 26 supporting a plurality of outwardly extending rotor poles 28. The rotor is operable to rotate within the stator, for example on appropriate energization of the stator poles. For illustrative clarity, the figure does not show other possible components, such as a driveshaft turned by the rotor.

At least one stator pole tip supports a near field plate, the near field plate modifying the magnetic flux distribution passing through the near field plate, so as to increase the torque and/or reduce the torque ripple of the switched reluctance motor. The near field plate may be configured to provide one or more regions of increased flux density within a rotor pole, as the rotor pole passes proximate the stator pole. A near field plate may effectively focus the magnetic field at one or more locations within a proximate rotor pole.

As the rotor rotates within the stator, in some configurations a stator pole and rotor pole are proximate and separated by an air gap. Magnetic flux generated by the stator coil(s) passes through the stator pole, and out of the stator pole tip through the near field plate. The near field plate focuses the field distribution so as to create regions of focused or concentrated flux density. The near field plate reduces the uniformity of the magnetic field at the rotor pole.

As will be discussed further below, the use of one or more magnetic field focusing devices, such as near field plates or shaped elements, allows remarkable improvements in torque and/or torque ripple of a motor in which they are used.

Figure 2:
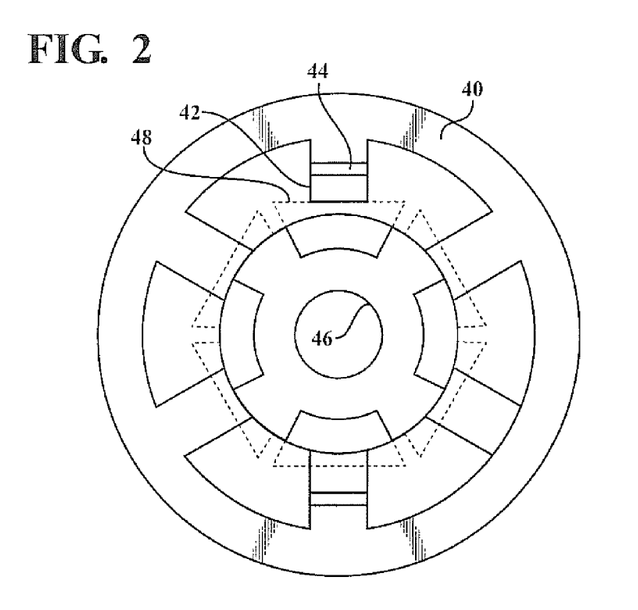
FIG. 2 shows a simulated configuration, as an example of a novel method of optimizing the field distribution for an apparatus such as shown in FIG. 1.

FIG. 2 shows a geometry used for optimization of the magnetic field, and hence design of the near field plates. The simulated structure includes stator 40, stator pole 42, permanent magnet 44, rotor 46, and geometrical design domain 48. The dotted lines around the pole tip regions represent geometrical design domains which include a pole tip having a shaped element. Hence, the simulated structure of FIG. 2 may correspond closely to that of the apparatus to be optimized (such as the motor of FIG. 1), using a shaped element to represent the effect of the near field plates.

By optimizing the shaped elements on the stator pole tips, an improved field distribution is deter lined. A near field plate can be tailored to give any desired field distribution. The use of permanent magnets to replace the coils allows geometry effects of the shaped elements to be removed from the simulation, more closely representing the effect of the near field plates.

Figure 3A:
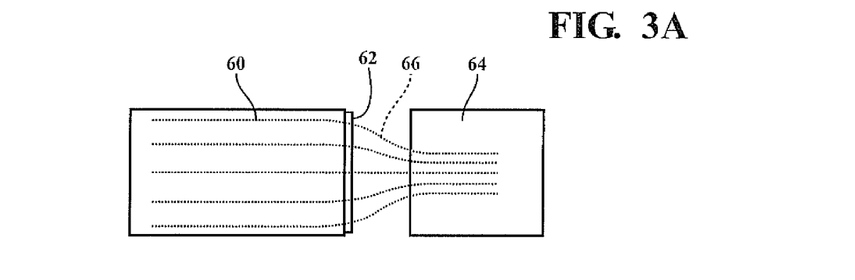
FIGS. 3A-3C illustrate the focusing effect of a near field plate, and in the case of FIG. 3C the simulation approach applied.
Figure 3B:
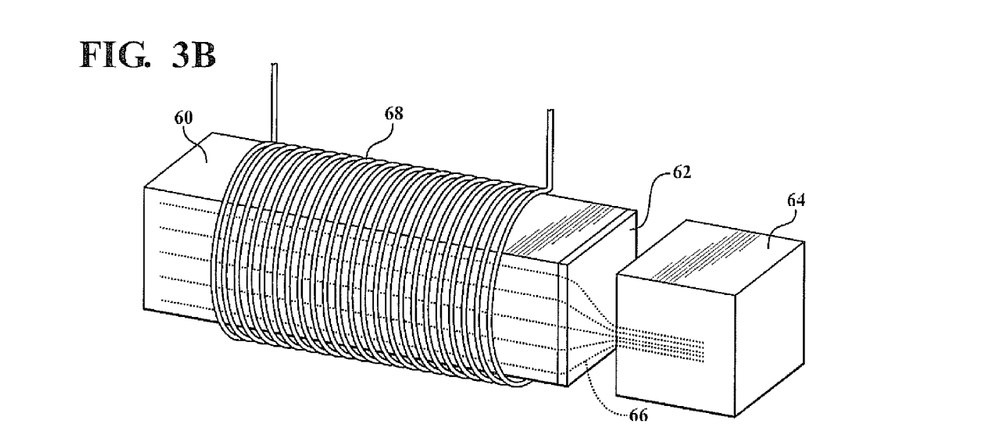
Figure 3C:
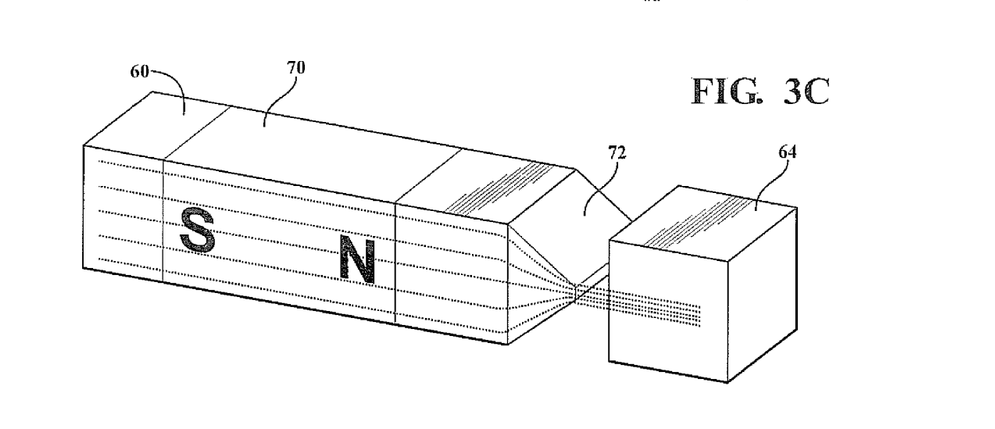

FIGS. 3A-3C illustrate the magnetic field focusing effect of an NFP. FIG. 3A shows a stator 60 having a pole tip supporting a near field plate 62. The NFP may be thin compared to the geometrical extent of the stator pole. Field lines, indicated as thin dotted lines 66, are focused after passing through the NFP and are concentrated within the central region of the rotor portion 64. This illustration is generally true for any magnetic device, and may also represent an improved actuator component where element 60 represents the electromagnet of an actuator, and element 64 corresponds to the movable plunger of the actuator. However, for conciseness, the present examples are restricted to motors.

FIG. 3B is a similar configuration, in which the field lines are generated by an electromagnet in the form of a coil 68 disposed around the element 60. The flux lines, shown as dotted lines 66, can be seen to concentrate within a central portion of the rotor element 64.

FIG. 3C further illustrates the novel design approach used to obtain optimized field distributions. The electromagnet 68 in FIG. 3B is replaced by a permanent magnet 70, indicated by the letters S and N corresponding to south and north poles. Here, the direction of the field is not significant. In this example, the near field plate is replaced by shaped element 72. The flux lines propagate through the pole and are focused by shaped element 72 into the central portion of rotor portion 64. Optimization of the shaped element using a gradient-based approach allows the optimal field distribution to be found. A near field plate or similarly shaped magnetic element can then be used to provide such a field distribution in an improved motor.

In representative examples, a near field plate is configured to provide magnetic field focusing similar to that obtained using the shaped elements in the optimization process. Optimization of the shaped element allows the optimal field to be determined, and a near field plate can then be designed to provide that optimal field. In other examples, a magnetic field focusing device having a similar faun to the optimized shaped element may be used in an improved reluctance motor.

Figure 4A:
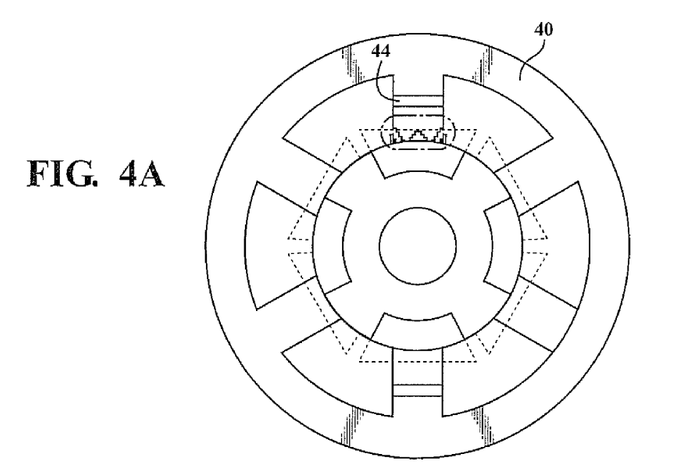
FIGS. 4A-4C show an improved field distribution obtained using a near field plate.
Figure 4B:
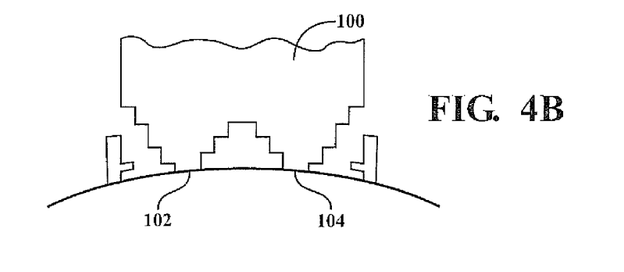

FIGS. 4A-4B illustrate results of a novel design approach for an SRM. In this example, similar to that shown in FIG. 2, the stator 40 includes a permanent magnet 44 corresponding to the stator coil within that pole. FIG. 4B shows an enlarged view of the shaped element 100, showing protruding portions 102 and 104. A near field plate is then designed to give a field distribution similar to that represented by the optimized shaped element. In other examples, an improved motor includes a stator having a magnetic field focusing device similar to the shaped element.

Figure 4C:
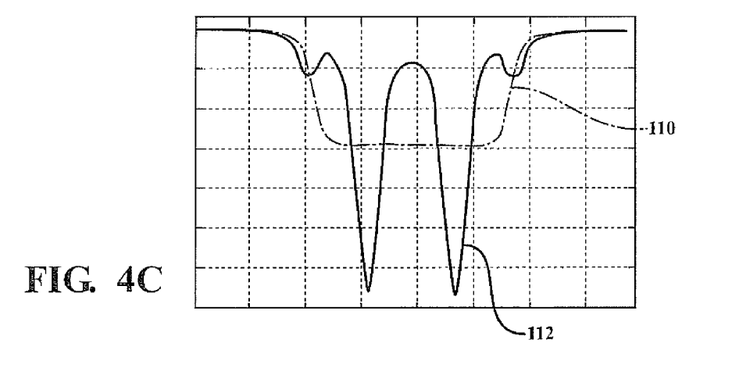

FIG. 4C shows an example field distribution obtained without a near field plate 110 (no focusing) and with a near field plate at 112 (field focusing).

Figure 5:
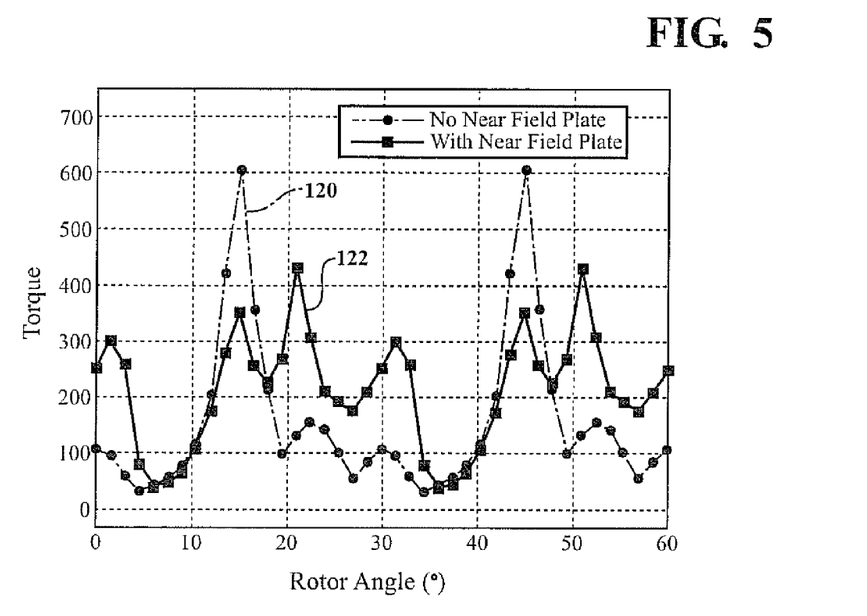
FIG. 5 shows improved torque profile results (torque increase and toque ripple reduction) obtained using a configuration of FIGS. 4A-4C.

FIG. 5 shows the torque versus rotor angle curve for the field focusing and non-field focusing approaches, showing that the torque ripple may be significantly reduced using a near field plate (or other magnetic field focusing device) to obtain field focusing.

FIG. 5 illustrates an average torque that is increased from 157 Nm to 210 Nm, for no near field plate and using an NFP, respectively. The figure also corresponds to a reduction in the percentage of torque ripple from 64% to 39% with the introduction of an NFP. The magnetic force increase may be due to a redistribution of the magnetic field within the air gap, and does not require an increase in total magnetic flux.

Figure 6A:
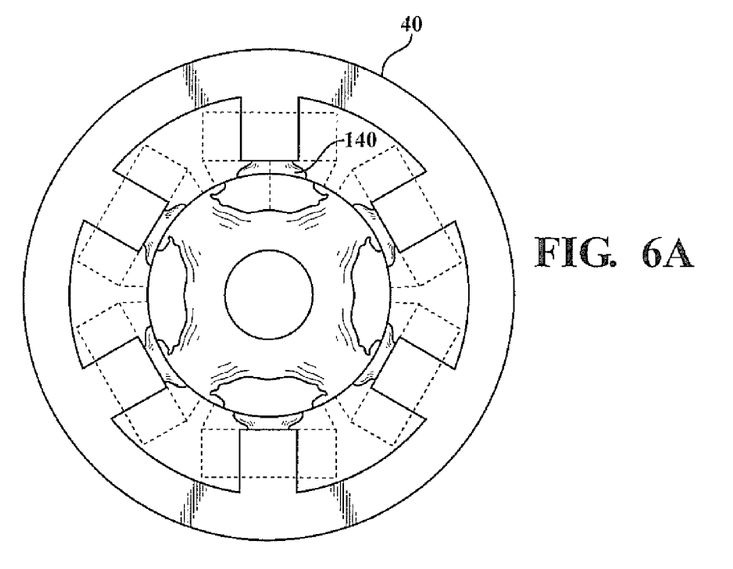
FIG. 6A shows a non-optimized geometry.
Figure 6B:
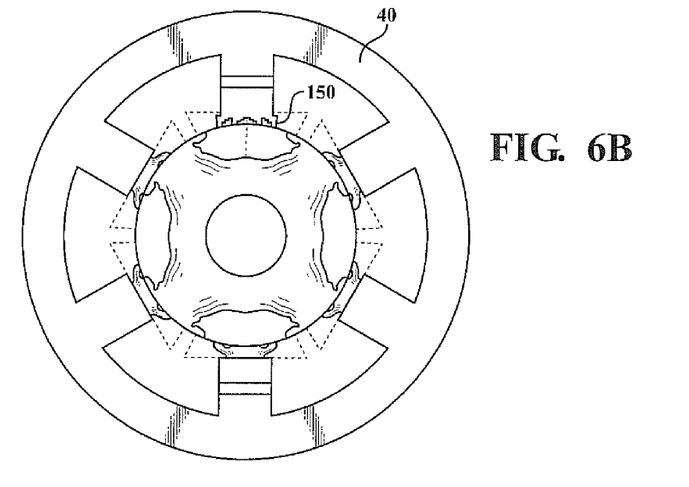
FIG. 6B shows an optimized geometry for the optimal magnetic field distribution, for a switched reluctance motor.

FIG. 6A is a further illustration of the approach to field optimization. FIG. 6A is similar to FIG. 2 showing a non-optimized field profile at 140, and a representation of the field distribution in the rotor. FIG. 6B shows an optimized field profile at 150. An improved motor may include a near field plate or other magnetic field focusing device configured to give the field focusing shown.

Figure 7A:
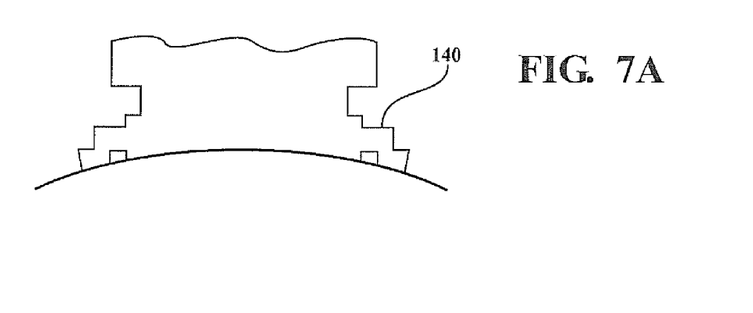
FIGS. 7A and 7B show geometries for non-optimized and optimized field distribution, respectively.
Figure 7B:
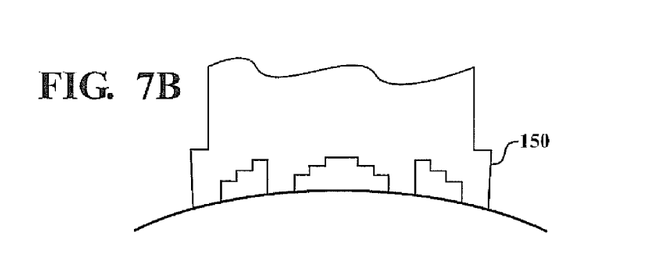

FIG. 7A shows the non-optimized field profile in more detail, and for comparison the optimized shaped element and hence field profile is shown in FIG. 7B. The optimal geometry includes four regions corresponding to increased flux density within the rotor. This is better illustrated by FIGS. 8A and 8B, which show flux lines.

Figure 8A:
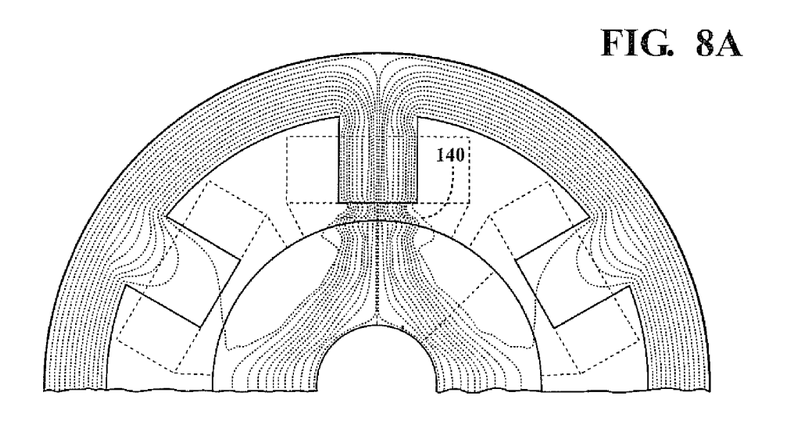
FIGS. 8A and 8B show magnetic flux lines for optimized and non-optimized geometries, respectively.
Figure 8B:
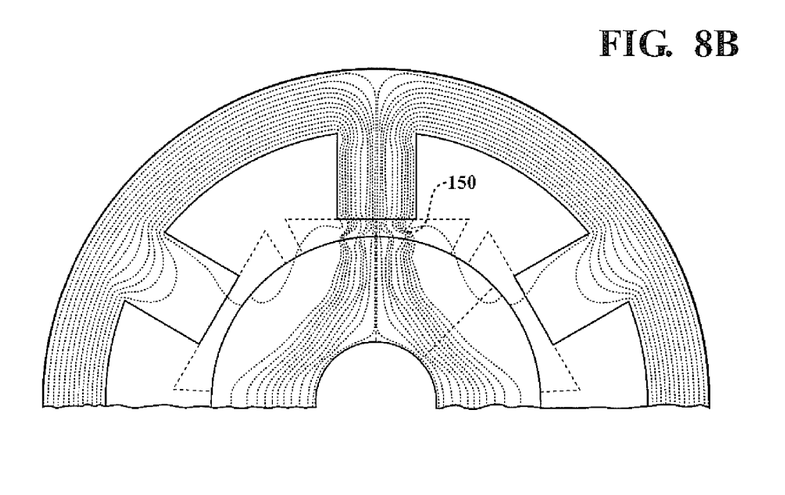

FIG. 8A shows the flux lines for the non-optimized case, and FIG. 8B shows the flux line distribution for the optimized case. Looking at FIG. 8B at 150, the flux distribution is significantly modified compared with the non-optimized version near the air gap between the stator and the rotor components. Before optimization, the flux density was generally uniform across the stator pole. However as illustrated in FIGS. 7B and 8B, the flux density after optimization is concentrated at four locations across the extent of the stator pole.

Figure 9:
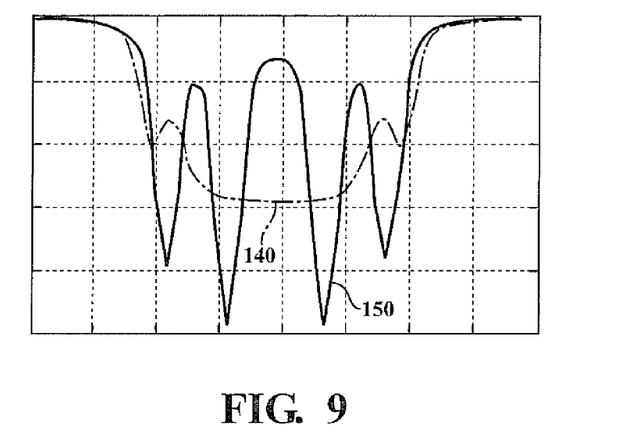
FIG. 9 shows field distributions in the optimized and non-optimized configurations.

FIG. 9 further shows the optimized field distribution 150 compared with the non-optimized field distribution 140.

Figure 10:
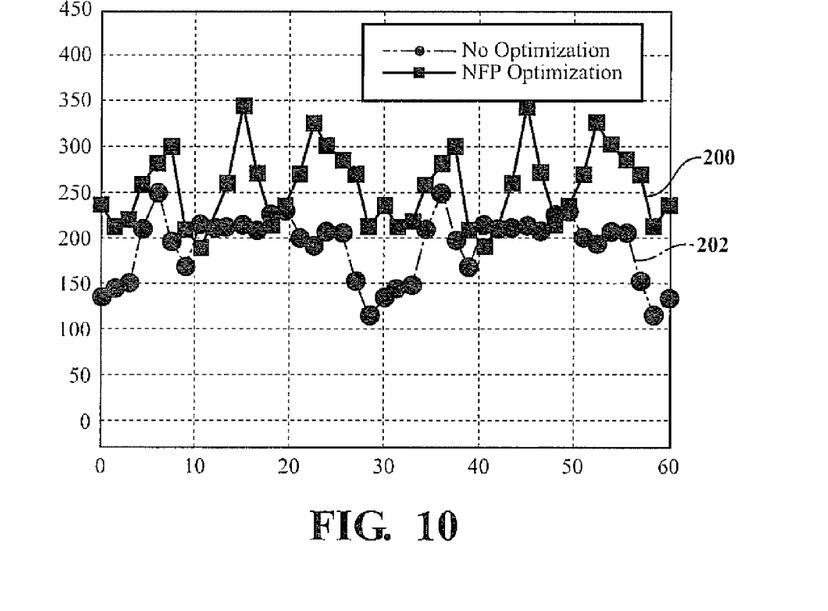
FIG. 10 shows the improved torque profile result (torque increase without losing torque ripple performance) obtained using an optimized field distribution.

FIG. 10 shows the torque versus angle curves for the SRM with and without optimization, at 200 and 202 respectively. The results of FIG. 10 show the total torque curve before and after the use of an NFP. The average torque increases from 191.8 Nm to 255.4 Nm, an increase of approximately 33%. The percentage torque ripple decreases from 15.2% to 14.4%, an approximately 5% decrease. Hence using four focused field locations using an NFP allows an increased average torque, and a decrease in torque ripple.

A novel two-dimensional simulation model and design approach was used for field optimization. In this approach, the stator geometry near the air gap is optimized. The stator geometry in the simulation then corresponds to the desired magnetic field distribution obtained using the NFP. In the simulations, the stator coil is replaced by a permanent magnet to remove the geometry effect.

Further Discussion of Novel Optimization Method

Examples of the present invention include improved methods of finding the optimized field distribution, for example using a permanent magnet to replace the coil, and using a shaped stator near the air gap to simulate the effect of the near field plate. In the cases illustrated in FIGS. 2 and 6A, both average torque increase and ripple reduction were design goals used for the optimizations. The two design goals (average torque increase and ripple decrease) were used for the optimization for both these cases. The model of FIG. 6A was already geometrically optimized to minimize torque ripple before the near field plate optimization, as can be seen in the curve 202 of FIG. 10, which is the reason why the ripple was slightly decreased (from 15.2% to 14.4%) in the near field plate optimization.

Examples of the present invention also include an improved design method for magnetic apparatus such as motors. In the design method, the effect of the near field plate is modeled using a shaped magnetic element. By optimizing the shape of the magnetic element, an optimized field distribution is used. The near field plate can then be designed using the optimized field distribution.

In the novel design method, the magnetic field is provided by a permanent magnet (PM), rather than an electromagnet. The magnetic flux from the permanent magnet passes through the shaped magnetic element. A geometrical design domain including the shaped magnetic element is configured to optimize the torque, torque ripple, or other parameter or combination of parameters.

In the simulated and optimized configuration, the stator and rotor of the motor under optimization are replaced by a similar steel structure, except that the magnetic field is provided in the simulated case by a permanent magnet. Using a permanent magnet allows the field distribution to be modeled through a geometric design of a shaped element on the stator tip. For example, if the shaped element has a tapered form (such as a cone or frustoconical shape), the magnetic field is greater within the narrower portions of the shaped element. This corresponds to focusing the magnetic field using a near field plate, or other magnetic field focusing device. Then, for example, optimization of the degree of taper is used as a proxy for optimization of the degree of focusing provided by the near field plate. Alternatively, a magnetic field focusing device having a similar form to the shaped element used may be used. For example, the magnetic field focusing device may comprise a tapered shaped element, such as a conical, pyramidal, or truncated form such as a frustoconical shape or truncated pyramid, or other tapered form having a cross-section that decreases along an inward radial direction. The shaped element may comprise a low reluctance material, in some examples having a lower reluctance than other motor components. The shaped element may be supported by the stator pole, and may be an integrated part of the stator pole.

In an electromagnetic motor, the decreased permeance of a shaped element may reduce the torque of the motor. However, by using a modeling approach in which the coils are replaced by permanent magnets, the shaped element can be optimized, the optimized shape is then used to determine the optimized field distribution, and the optimized field distribution can then be used to configure the NFP.

A time stepping finite element analysis may be used to simulate and optimize the field distribution for torque ripple minimization and/or total torque increase. A geometry optimization problem is solved to determine the optimal field distribution for a near field plate attached to the stator near an air gap. By finding the optimal geometrical shape of the stator within the simulation approach, the corresponding characteristics of the NFP are determined.

Torque Increase Due Field Focusing

The increased magnetic force may result from the presence of squared terms in magnetic field within the Maxwell stress tensor formulation. Hence, for an evenly distributed field a certain magnetic force may be obtained, and this may be increased by redistributing the magnetic flux to obtain one or more regions of focused field.

The magnetic force may be calculated using an equation including square terms of magnetic flux density. Equation 1 below shows the magnetic force calculation using Maxwell stress tensor formulation:

$$F_s = \left[\frac{1}{\mu_0} B_n B_t\right] n + \left[\frac{1}{2\mu_0}(B_n^2 - B_t^2)\right] t \quad (1)$$

The surface force densities using the Maxwell stress tensor method may be calculated for an evenly distributed field and for a focused field in terms of normal and tangential field components. For an evenly distributed field (no field focusing) and alignment of stator and rotor poles, the field components are relatively constant across the rotor pole, and the magnetic force is also evenly distributed. Magnetic field focusing increases the magnetic field values at one or more focus locations within the rotor pole, and reduces the field values at others. However, due to the presence of squared field terms in the force equation, the increased force at regions of higher magnetic flux more than compensates for the reduced force at regions of reduced flux, and overall the magnetic force may increases. The Maxwell stress method can also be used for complex geometries.

Further, in a magnetic device, magnetomotive force is required to push the magnetic flux across the air gap. A focused field may find it easier to pass across the air gap, so that the presence of a focused field works as a reduced air gap in the device.

Hence, using a near field plate increases the magnetic torque across the rotor-stator gap, while avoiding geometric effects due to shaped elements in the electromagnet. However, in some examples, magnetic field focusing devices in the form of shaped elements may be used.

Near Field Plates

The near field plate may be a patterned, grating-like plate having sub-wavelength features. The near field plate may comprise capacitive elements, a corrugated surface, or other configuration, such as those described by Grbic and coworkers. Near field plates may focus electromagnetic radiation to spots or lines of arbitrarily small subwavelength dimensions.

Near field plates used in examples of the present invention include devices such as those described by Grbic and coworkers. However, previous discussions of such near field focusing plates have concentrated on high frequency applications, where the diffraction limit is a problem to be overcome. The present invention uses such near field plates to achieve focusing of low frequency (for example kilohertz) frequency electromagnetic signals used in electromagnetic devices such as reluctance motors.

The design and configuration of example near field plates is described in detail in the following references: Imani and Grbic, "Near-field focusing with a corrugated surface", IEEE Antennas and Wireless Propagation Letters, Vol. 8, 2009; Grbic et al., "Near-field plates: subdiffraction focusing with patterned surfaces", Science, Vol. 320, 2008; Grbic and Merlin, "Near-field focusing plates and their design", IEEE Trans. on Antennas and Propagation, Vol. 56, 2008; and US2009/0303154 to Grbic et al.

In examples of the present invention, the use of a near field plate is not suggested by any recognized need to overcome a diffraction limited focusing problem. A near field plate is used to modify the magnetic field distribution at a movable rotor to achieve a greater magnetic torque on the rotor.

A near field plate may comprise patterned conducting elements (such as wires, loops, corrugated sheets, capacitive elements, inductive elements, and/or other conducting elements) formed on or otherwise supported by a dielectric substrate. An example near field plate has a surface impedance with sub-wavelength structure. The surface impedance structure, and hence pattern of conducting elements, may be determined using back-propagation methods from the desired field focusing properties, for example as described by US2009/0303154 to Grbic et al. A near field plate may include grating-like sub-wavelength structures. Other structures include a circular corrugated surface, such as a grooved surface with a radial profile in the form of a Bessel function. Focusing may be two-dimensions (e.g. focused about a line) or three dimensional (e.g. focused around a point within the end portion of the plunger)

A near field plate may be generally planar, or in other examples may be curved to conform to a surface (e.g. a curved or other non-planar end surface of an electromagnet, for example the tip of a stator pole).

Further Aspects

Examples of the present invention include magnetic devices, such as reluctance motors, in particular switched reluctance motors, in which a modified field distribution is used to obtain improved characteristics. For example, higher torque or other forces may be obtained by concentrating the field within regions of an air gap between, for example, a stationary element (or stator) and a moving element such as a rotor using a magnetic field focusing device, which may be a shaped element associated with the stator pole, or a near field plate.

The magnetic field focusing device acts to concentrate the magnetic flux within one or more regions proximate the pole tip when the associated stator coil is energized. As a rotor pole passes the stator pole, the regions of concentrated magnetic flux may then be located near, at, or within the rotor pole as it passes by the stator pole.

A method of increasing the average torque and reduce the torque ripple of a reluctance motor, such as an SRM design, includes attaching magnetic field focusing devices, such as those described herein, to the stator pole tips.

The invention is not restricted to the illustrative examples described above. Examples described are not intended to limit the scope of the invention. Changes therein, other combinations of elements, and other applications will occur to those skilled in the art.

Having described our invention, we claim:

1. An apparatus, the apparatus being a switched reluctance motor comprising:
   a rotor, including a central rotor portion supporting a plurality of outwardly extending rotor poles; and
   a stator, including stator poles extending inwardly towards the rotor,
   each stator pole having a stator pole tip and an associated stator coil,
   the rotor being operable to rotate within the stator on sequential energization of stator coils,
   each stator pole tip having a near field plate having a spatially modulated surface reactance configured to produce at least one concentrated magnetic flux region proximate the pole tip when the associated stator coil is energized.

2. The apparatus of claim 1, each stator pole having an inwardly directed end face, the near field plate being located at the end face.

3. The apparatus of claim 1, the near field plate producing a plurality of concentrated magnetic flux regions proximate the end face.

4. The apparatus of claim 3, the plurality of concentrated magnetic flux regions including flux concentrations at four locations across the stator pole.

5. The apparatus of claim 1, the near field plate being configured to increase the average torque of the switched reluctance motor by at least 33% relative to an identical switched reluctance motor without the near field plate.

6. The apparatus of claim 1, the near field plate being configured to reduce the torque ripple of the switched reluctance motor by at least 39% relative to an identical switched reluctance motor without the near field plate.

7. The apparatus of claim 1, the stator coils being sequentially energizable by an alternating signal source having a signal frequency in the range 50 Hz -100 kHz.

8. The apparatus of claim 7, the signal frequency being in the range 100 Hz -10 kHz.

9. The apparatus of claim 1, the stator having an annular stator portion, the stator poles extending inwardly from the annular portion,
   the annular stator portion having an outer diameter in the range 1 cm -50 cm.

10. A method of increasing the average torque of a switched reluctance motor including a stator and a rotor, each stator having a pole tip and supporting a stator coil, the method comprising:
    locating a near field plate on the pole tip of on each stator pole, the near field plate having a spatially modulated surface reactance and being configured to produce at least one region of concentrated magnetic flux proximate the pole tip when the stator coil is energized.

* * * * *

UNITED STATES PATENT AND TRADEMARK OFFICE
CERTIFICATE OF CORRECTION

PATENT NO. : 8,736,136 B2
APPLICATION NO. : 13/028712
DATED : May 27, 2014
INVENTOR(S) : Jaewook Lee et al.

Page 1 of 1

It is certified that error appears in the above-identified patent and that said Letters Patent is hereby corrected as shown below:

Title Page, item (75), line 4, inventors:, Please delete "Hideo Iizuka, Nissin (JP)", Insert --Hideo Iizuka, Ann Arbor, MI--

Signed and Sealed this
Twenty-third Day of December, 2014

Michelle K. Lee
*Deputy Director of the United States Patent and Trademark Office*